United States Patent [19]
Gruber et al.

[11] Patent Number: 5,803,034
[45] Date of Patent: Sep. 8, 1998

[54] CYLINDER HEAD COVER WITH DRAINAGE-GROVE INDENTATION FOR AN INTERNAL-COMBUSTION ENGINE

[75] Inventors: Gerhard Gruber, Backnang; Rolf Klingmann, Pluederhausen; Werner Hofheinz, Plochingen, all of Germany

[73] Assignee: Daimler-Benz AG, Germany

[21] Appl. No.: 897,147

[22] Filed: Jul. 21, 1997

[30] Foreign Application Priority Data

Jul. 20, 1996 [DE] Germany .................. 196 29 308.1

[51] Int. Cl.$^6$ ...................................................... F01M 9/10
[52] U.S. Cl. ................................. 123/90.38; 123/195 C; 123/470
[58] Field of Search .................... 123/90.37, 90.38, 123/195 C, 198 E, 470

[56] References Cited

U.S. PATENT DOCUMENTS

| | | | |
|---|---|---|---|
| 4,757,789 | 7/1988 | Laine ....................................... | 123/470 |
| 4,993,375 | 2/1991 | Akihiko ............................... | 123/90.38 |
| 5,129,371 | 7/1992 | Rosalik, Jr. ........................ | 123/90.38 |
| 5,323,740 | 6/1994 | Daily et al. ........................... | 123/90.38 |
| 5,367,993 | 11/1994 | Tulach et al. ........................ | 123/90.38 |
| 5,452,690 | 9/1995 | Kobayashi ............................ | 123/90.38 |

FOREIGN PATENT DOCUMENTS

| | | |
|---|---|---|
| 2149881 | 3/1973 | France . |
| 43 15 233 A1 | 7/1994 | Germany . |
| 44 37 714 A1 | 7/1995 | Germany . |

*Primary Examiner*—Weilun Lo
*Attorney, Agent, or Firm*—Evenson, McKeown, Edwards & Lenahan, P.L.L.C.

[57] ABSTRACT

A cylinder head cover for a direct-injecting internal-combustion engine has an injection nozzle holder arranged in the cylinder head between charge cycle valves and a clamping shoe for fixing the position of the injection nozzle holder in a receiving bore in the cylinder head. The cylinder head cover is constructed to be pulled in in the area of the injection nozzle holder and has a passage for the injection nozzle holder. The pulled-in cylinder head cover in the area of the injection nozzle holder is pulled down to the cylinder head. Starting from that area, a drainage-groove-type indentation leads to the inlet side of the internal-combustion engine.

7 Claims, 4 Drawing Sheets

CYLINDER HEAD COVER WITH DRAINAGE-GROVE INDENTATION FOR AN INTERNAL-COMBUSTION ENGINE

BACKGROUND AND SUMMARY OF THE INVENTION

This application claims the priority of 196 29 308.1, the disclosure of which is expressly incorporated by reference herein.

The present invention relates to a cylinder head cover for a direct-injecting internal-combustion engine, and more particularly, to a cylinder head cover for a direct-injecting internal-combustion engine having an injection nozzle holder arranged in the cylinder head between charge cycle valves, and having a clamping shoe for fixing the position of the injection nozzle holder in a receiving bore in the cylinder head, the cylinder head cover being constructed to be pulled in in the area of the injection nozzle holder and having a passage for the injection nozzle holder.

DE 43 15 233 A1 shows a cylinder head cover which is constructed to be pulled in in the area of the injection nozzle holder and pulled down to a sealing sleeve which projects far out of the cylinder head. The sealing sleeve surrounds the injection nozzle holder which is pressed by a clamping shoe arranged in the cylinder head by way of the sealing sleeve onto a seat in the cylinder head. In this known construction, the penetration of fuel into the oil space situated between the cylinder head and the cylinder head cover is avoided.

It is an object of the present invention to construct a cylinder head cover which permits a simplified machining of the cylinder-head-cover-side contact surface of the cylinder head and, in the event of the occurrence of a fuel leakage, prevents ignition of the fuel on hot parts of the internal-combustion engine.

This object has been achieved according to the present invention that the cylinder head cover pulled in in the area of the injection nozzle holder is pulled down to the cylinder head and in that starting from this area, a drainage-groove-type indentation leads to the inlet side of the internal-combustion engine.

As the result of the above features according to the present invention, specifically pulling the cylinder head cover in the area of the injection nozzle holder down to the cylinder head, a significantly facilitated machining of the cylinder-head-cover-side contact surface of the cylinder head is achievable because no parts which penetrate from the cylinder head into the cylinder head cover, such as a sealing sleeve surrounding the injection nozzle holder, hinder the machining of the contact surface.

Furthermore, as a result of the arrangement and the course of the drainage-groove-type indentation of the cylinder head cover, the fuel can flow off to the relatively cold inlet side in a targeted and risk-free manner in the event of a fuel leakage, whether due to leakage points on the injection nozzle holder or a leaky connection between the injection nozzle holder and the injection pipe.

Another advantage of the present invention is that the pulled-down portion of the cylinder head cover simultaneously constitutes the boundary or shut-off wall for an oil space situated in the cylinder head.

In addition, the pulled-down part of the cylinder head cover can contain a supporting body constructed as a ball, whereby the two components may be constructed separately or may be manufactured of one piece.

The supporting body can also be constructed as a pin which breaks through the pulled-down portion of the cylinder head cover and is firmly fitted into a pocket bore in the cylinder head. This construction can reinforce the sealing effect of the surrounding seal, particularly if the surrounding seal surrounds not only the injection nozzle holder and the fastening screw but also the supporting body.

The pulled-down portion of the cylinder head cover is found to be particularly advantageous in the case of multi-cylinder internal-combustion engines because this part can be constructed to form a continuous shaft which extends in the longitudinal direction of the internal-combustion engine and has transversely extending branches as drainage-groove-type indentations.

BRIEF DESCRIPTION OF THE DRAWINGS

Other objects, advantages and novel features of the present invention will become apparent from the following detailed description of the invention when considered in conjunction with the accompanying drawings wherein.

DETAILED DESCRIPTION OF THE DRAWINGS

Figure 1:
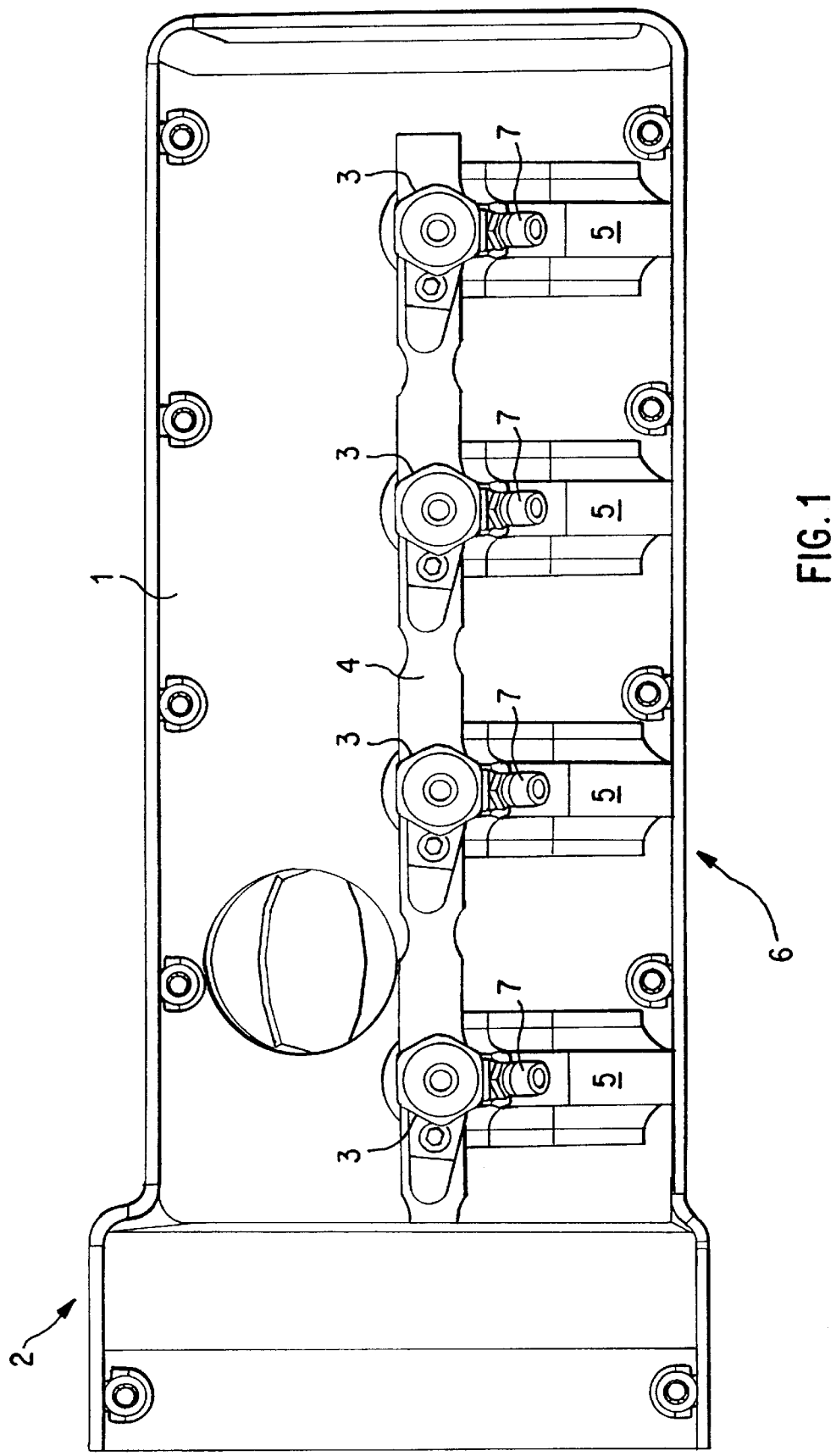
FIG. 1 is a plan view of a cylinder head cover according to the present invention with a pulled-in part and indentations branching away therefrom.

A one-piece cylinder head cover 1 for a multi-cylinder, direct-injecting internal-combustion engine, as seen in FIG. 1, is constructed in the longitudinal center of the internal-combustion engine to be pulled in in the area of the injection nozzle holders 3 such that a continuous shaft 4 is formed to extend along all of the injection nozzle holders 3.

Drainage-groove-type indentations 5 branch off transversely of the shaft 4 at the level of the injection nozzle holder 3 and lead to the inlet side 6 of the internal-combustion engine 2. Each injection nozzle holder 3 has a connection 7 for a conventional injection pipe. The connections between the injection nozzle holders 3 and the injection pipes are situated above the respective assigned indentations 5 such that, in the event of leakages, the fuel can first be collected in the shaft and can then flow off by way of the drainage-groove-type indentation 5.

Figure 2:
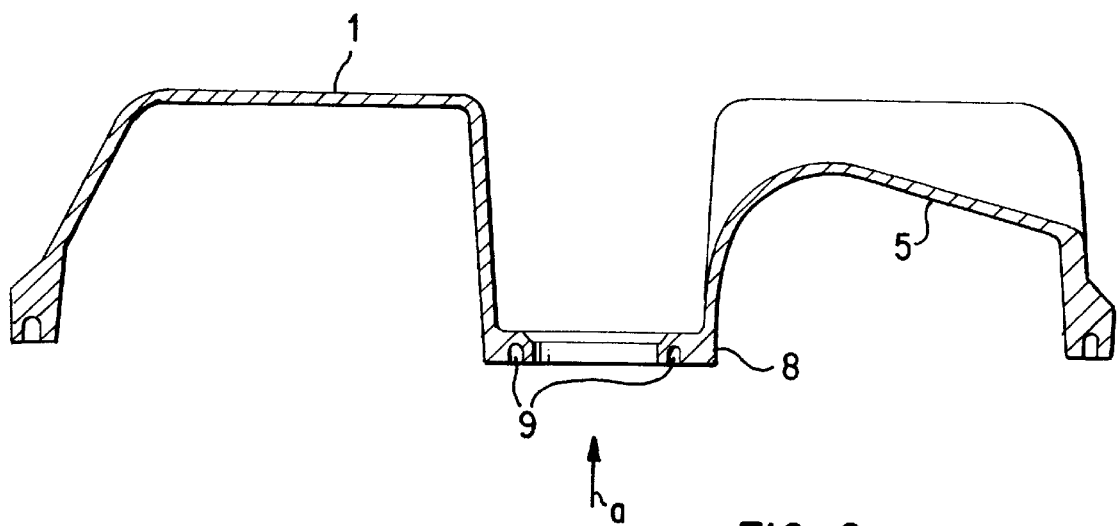
FIG. 2 is a cross-sectional view of only the pulled-in cylinder head cover with the indentation according to the present invention.

FIG. 2 shows an embodiment of the cylinder head cover 1 of the pulled-in construction with the inlet-side drainage-groove-type indentation 5. On its underside, the pulled-down part 8 is provided with a groove 9 which is intended for a surrounding seal 10 shown in FIG. 3. Each injection nozzle holder 3 is fitted in a receiving bore 11 in the cylinder head 12 and is pressed by a clamping shoe 13 by way of a fastening screw 14 penetrating this clamping shoe 13 and the pulled-down part 8 of the cylinder head cover 1 onto its seat 15 in the cylinder head 12.

The clamping shoe 13 is supported on a ball-shaped supporting body 16 disposed in the pulled-down part 8. The ball 16 and the part 8 can also be one piece, in which the ball is shaped from the part 8, or the ball and the part 8 can form two separate components in which the ball is pressed firmly into the part 8 provided with a corresponding recess 17 as seen in FIG. 3.

Figure 4:
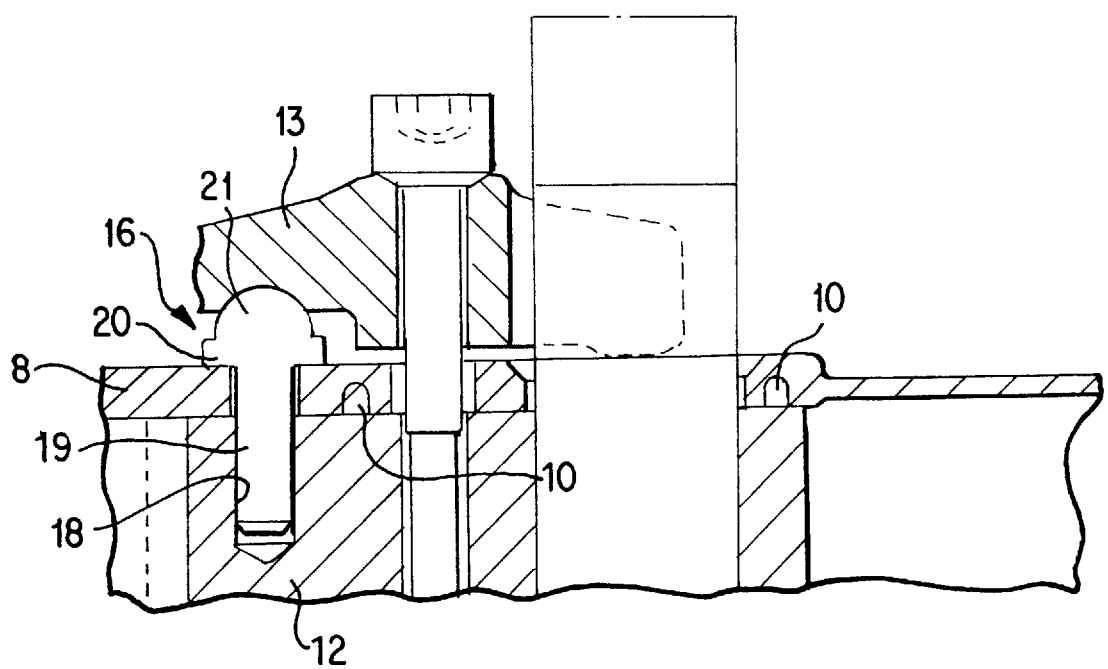
FIG. 4 is a view of another embodiment in which the pulled-down part is penetrated with a supporting body.

In FIG. 4, the supporting body 16 is in the form of a pin 19 which penetrates the part 8 and is fixed in a pocket bore 18 in the cylinder head 12, a collar 20 resting on the part 8, and a hemispherical head 21 on which the clamping shoe 13 is supported.

Figure 5:
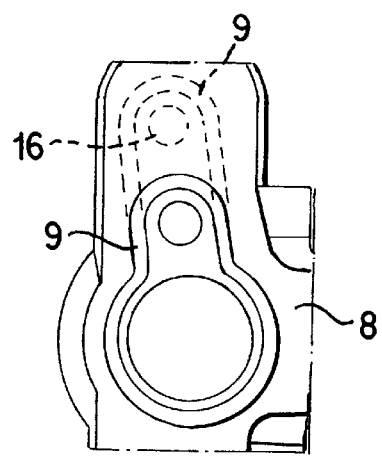
FIG. 5 is a view of the pulled-down part with a groove for the surrounding seal in the direction of arrow a of FIG. 2, with the broken lines illustrating a construction in which the surrounding seal also surrounds the bore for the supporting body of FIG. 4.
Figure 3:
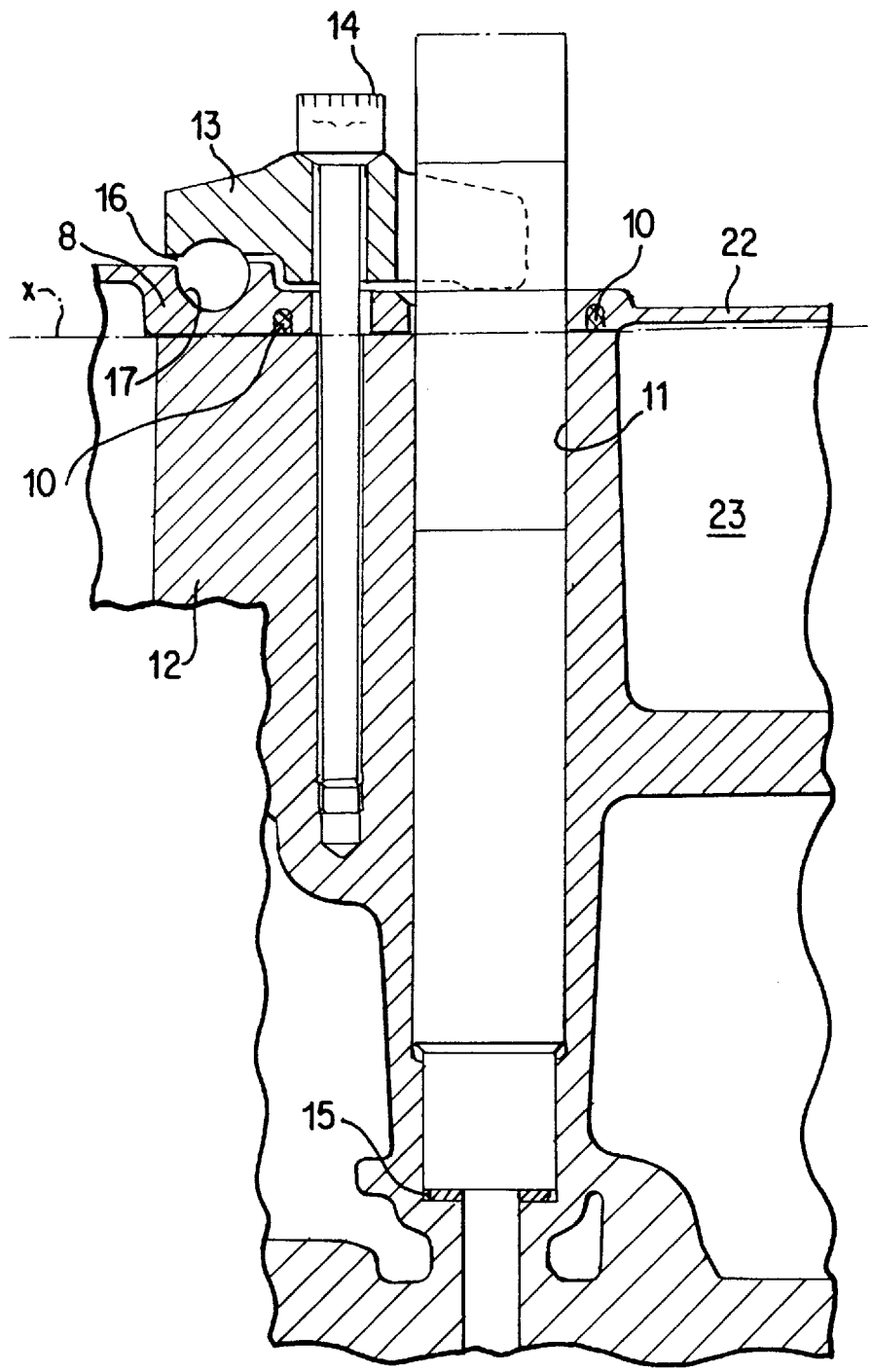
FIG. 3 is a view of an embodiment in which the pulled-down part with a spherical supporting body between the clamping shoe and the cylinder head.

In the two embodiments according to FIGS. 3 and 4, the surrounding seal 10 surrounds the injection nozzle holder 3 and the fastening screw 14. However, the surrounding seal shown in FIG. 5, can also, in addition, surround the supporting body 16 (as seen in broken lines) if the surface pressure between the collar of the supporting body 16 and the part 8 is not sufficient for a purely metallic sealing.

The pulled-down part 8 of the cylinder head cover 1 has both the function of a collecting basin and also the function of a shut-off wall or boundary wall 22 for an oil space 23 situated in the cylinder head 12 as seen in FIG. 3. In the area of the junction plane x between the cylinder head and the cylinder head cover 1, the cylinder head 12 is constructed such that an unhindered, cutting machining is possible because no parts, as, for example, a sealing sleeve surrounding the injection nozzle holder, project out of the cylinder head.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Cylinder head cover for a direct-injecting internal-combustion engine, comprising an injection nozzle holder arranged in a cylinder head between charge cycle valves, and a clamping shoe configured to fix a position of the injection nozzle holder in a receiving bore in the cylinder head, the cylinder head cover being pulled-in configured in an area of the injection nozzle holder and having a passage for the injection nozzle holder, wherein the cylinder head cover is configured to be pulled down to the cylinder head, and from the area of the injection nozzle holder, a drainage-groove-type indentation leads to an inlet side of the internal-combustion engine.

2. The cylinder head cover according to claim 1, wherein the indentation extends transversely to a longitudinal plane of the internal-combustion engine in the area of the injection nozzle holder.

3. The cylinder head cover according to claim 1, wherein a fastening screw is arranged to penetrate the clamping shoe and be screwed into the cylinder head for fixing the position of the injection nozzle holder, on which fastening screw a free end of the clamping shoe rests, and another free end of the clamping shoe is supported on a cylinder head side via a supporting body, and, between a pulled-down part of the cylinder head cover which rests flatly on the cylinder head, and a seal is configured and arranged to surround the injection nozzle holder and the fastening screw or the supporting body jointly.

4. The cylinder head cover according to claim 3, wherein the pulled-down part forms a boundary wall of an oil space in the cylinder head.

5. The cylinder head cover according to claim 1, wherein the supporting body is a ball firmly connected with the pulled-down part.

6. The cylinder head cover according to claim 1, wherein the supporting body is a cylindrical pin with a collar and a hemispherical head and is configured to be fitted in a pocket bore in the cylinder head and penetrate the pulled-down part, the hemispherical head forming a supporting surface for the clamping shoe and the pulled-down part forming a contact surface for the collar adjoining the hemispherical head.

7. The cylinder head cover according to claim 1, wherein the engine is a multi-cylinder internal-combustion engine, and the pulled-down part, viewed in a longitudinal direction of the multi-cylinder internal-combustion engine forms a continuous shaft.

\* \* \* \* \*